(12) United States Patent
Suzuta

(10) Patent No.: US 8,110,304 B2
(45) Date of Patent: Feb. 7, 2012

(54) PACKING MATERIAL FOR LITHIUM CELL AND PRODUCTION METHOD THEREOF

(75) Inventor: Masayoshi Suzuta, Tokyo (JP)

(73) Assignee: Toppan Printing Co., Ltd., Tokyo (JP)

( * ) Notice: Subject to any disclaimer, the term of this patent is extended or adjusted under 35 U.S.C. 154(b) by 48 days.

(21) Appl. No.: 12/449,171

(22) PCT Filed: Jan. 31, 2008

(86) PCT No.: PCT/JP2008/051529
§ 371 (c)(1),
(2), (4) Date: Jul. 27, 2009

(87) PCT Pub. No.: WO2008/093778
PCT Pub. Date: Aug. 7, 2008

(65) Prior Publication Data
US 2010/0015451 A1 Jan. 21, 2010

(30) Foreign Application Priority Data
Jan. 31, 2007 (JP) .................. 2007-020954

(51) Int. Cl.
*H01M 2/02* (2006.01)
*B32B 9/00* (2006.01)
(52) U.S. Cl. ...... 429/163; 429/141; 429/175; 428/472.3
(58) Field of Classification Search .................. 429/163, 429/141, 175; 428/472.3
See application file for complete search history.

(56) References Cited

U.S. PATENT DOCUMENTS

| | | | |
|---|---|---|---|
| 3,140,196 A * | 7/1964 | Lacy et al. | 428/215 |
| 6,200,672 B1 | 3/2001 | Tadokoro et al. | |
| 6,562,474 B1 * | 5/2003 | Yoshimi et al. | 428/472.3 |
| 2002/0142178 A1 * | 10/2002 | Yamashita et al. | 428/461 |
| 2004/0029001 A1 * | 2/2004 | Yamazaki et al. | 429/176 |
| 2004/0142190 A1 | 7/2004 | Kawai et al. | |

FOREIGN PATENT DOCUMENTS

| | | |
|---|---|---|
| EP | 1 102 336 A1 | 5/2001 |
| EP | 1 160 892 | 12/2001 |
| EP | 1 359 631 | 11/2003 |
| EP | 1 629 969 | 3/2006 |
| JP | 2001-35453 | 2/2001 |
| JP | 2001-243928 | 9/2001 |
| JP | 2002-25511 | 1/2002 |
| JP | 2002-144479 | 5/2002 |
| JP | 2002-187233 | 7/2002 |

(Continued)

OTHER PUBLICATIONS

International Search Report for PCT/JP2008/051529, mailed Mar. 25, 2008.

(Continued)

*Primary Examiner* — Kevin R. Kruer

(57) ABSTRACT

A packing material for a lithium cell of the present invention includes a first adhesive layer, an aluminum foil layer, a coating layer, an adhesive resin layer or a second adhesive layer, and a sealant layer laminated sequentially onto one surface of a base material layer, wherein the coating layer includes a layer (A) in which 1 to 100 parts by mass of a phosphoric acid or a phosphate has been blended into 100 parts by mass of a rare earth element based oxide.

12 Claims, 4 Drawing Sheets

FOREIGN PATENT DOCUMENTS

| | | |
|---|---|---|
| JP | 2002-198013 | 7/2002 |
| JP | 2003-217529 | 7/2003 |
| JP | 2004-042477 | 2/2004 |
| JP | 2004-142302 | 5/2004 |
| JP | 4379543 | 12/2009 |

OTHER PUBLICATIONS

U.S. Appl. No. 12/680,081, filed Mar. 25, 2010, Masayoshi Suzuta, Toppan Printing Co., Ltd.

Office Action issued Jul. 19, 2010 in copending U.S. Appl. No. 12/680,081.

Office Action issued Aug. 20, 2010 in copending U.S. Appl. No. 12/680,081.

Office Action issued Jan. 19, 2011 in co-pending U.S. Appl. No. 12/680,081.

Interview Summary issued Apr. 28, 2011 in co-pending U.S. Appl. No. 12/680,081.

Notice of Allowance issued Aug. 15, 2011 in related U.S. Appl. No. 12/680,081.

Japanese Notice of Allowance issued Aug. 20, 2009 in corresponding Japanese Patent Application No. 2008-536409.

Extended European Search Report issued Nov. 16, 2011 in corresponding European Patent Application No. 08704276.8 (5 pages).

Japanese Notice of Allowance issued Aug. 20, 2009 in corresponding Japanese Patent Application No. 2008-536409 (previously cited and submitted in Attachments 1(e) and 1(g) with the IDS of Jan. 7, 2010).

* cited by examiner

PACKING MATERIAL FOR LITHIUM CELL AND PRODUCTION METHOD THEREOF

CROSS REFERENCE TO RELATED PATENT APPLICATIONS

This application claims the benefit under 35 U.S.C. Section 371, of PCT International Application Number PCT/JP2008/051529, filed Jan. 31, 2008, which claimed priority to Japanese Application No. 2007-020954 filed Jan. 31, 2007 in Japan, the contents of which are incorporated herein by reference.

TECHNICAL FIELD

The present invention relates to a packing material for a lithium cell and a production method thereof.

BACKGROUND ART

In recent years, lithium cells, which can be made in ultra thin forms and readily reduced in size, are being actively developed as the cells for use within portable terminals such as laptop computers and mobile phones, video cameras, and satellites and the like. In terms of the packing material used within these types of lithium cells, rather than the metal cases used as the packing material for conventional cells, multilayer films (such as a configuration including a heat-resistant base material layer/an aluminum foil layer/and a thermal adhesive film layer) formed in the shape of a pouch are now frequently being used, as they are lightweight and allow the shape of the cell to be selected freely.

Lithium cells contain, as cell contents, a positive electrode material, a negative electrode material, and either an electrolyte solution prepared by dissolving an electrolyte (a lithium salt) in an aprotic solvent having a penetrative ability such as propylene carbonate, ethylene carbonate, dimethyl carbonate, diethyl carbonate or ethyl methyl carbonate, or an electrolyte layer formed from a polymer gel impregnated with the above electrolyte solution. However, if the solvent having a penetrative ability penetrates through the thermal adhesive film layer that acts as a sealant, then the strength of the lamination between the aluminum foil layer and the thermal adhesive film layer tends to deteriorate, and eventually leads to leakage of the electrolyte solution.

Furthermore, as the lithium salt that acts as the electrolyte, $LiPF_6$ or $LiBF_4$ or the like is used. Because these salts generate hydrofluoric acid via a hydrolysis reaction with moisture, they can cause corrosion of metal surfaces or a deterioration in the lamination strength between the various layers of a multilayer film. By using an aluminum foil, the penetration of moisture from the surface of the packing material can be substantially blocked. However, in the lithium cell packing material, the multilayer film typically has a construction that is bonded together by heat sealing, meaning that hydrolysis of the lithium salt caused by moisture that penetrates via the edge face of the seal provided by the thermal adhesive film layer that functions as the sealant remains a concern. Accordingly, strengthening the interlayer adhesive strength between the aluminum foil and the thermal adhesive film layer in order to improve the durability (the electrolyte solution resistance and hydrofluoric acid resistance) of the cell contents is necessary.

Moreover, lithium cells are widely used in portable mobile phones, and the usage environment may sometimes reach very high temperatures of 60 to 70° C., for example, inside a vehicle in the middle of summer. A packing material for a lithium cell that exhibits favorable resistance to the electrolyte solution even under these types of high-temperature conditions has been keenly sought.

As a result, various methods are being investigated to inhibit the delamination that occurs between the aluminum foil layer and the thermal adhesive film layer due to the effects of the electrolyte solution or the hydrofluoric acid generated by hydrolysis of the lithium salt that functions as the electrolyte (see Patent Documents 1 to 4).

Patent Documents 1 to 3 disclose packing materials for lithium cells prepared by techniques such as extrusion lamination or thermal lamination, which do not undergo delamination even under the effects of the electrolyte solution or hydrofluoric acid. Patent Document 4 discloses a technique of improving the urethane-based adhesive used in a dry lamination method. This technique yields a urethane-based adhesive with superior electrolyte solution resistance, meaning a packing material that inhibits delamination can be obtained even using a dry lamination method.

However, in recent years, the functions demanded of the lithium cell packing materials used for packaging lithium cells have continued to increase. One example of a function now required of the packing material for a lithium cell is water resistance. However, as described above, because hydrofluoric acid is generated by hydrolysis of the lithium salt that functions as the electrolyte, evaluations that use water have generally not been included within the methods used for evaluating the lithium cell packing material. However, amongst the various environments in which the lithium cell may be used, accidents such as a situation where a mobile telephone is accidentally dropped into water can be readily conceived. In such cases, there is a possibility that the lack of water resistance may cause delamination, or that the increase in hydrofluoric acid production caused by the excessive absorption of moisture may cause corrosion of the aluminum foil, resulting in delamination. Accordingly, further improvements in both the water resistance and hydrofluoric acid resistance are desirable.

For these types of reasons, the necessity of evaluating water resistance as one of the methods used for evaluating lithium cell packing materials is gradually becoming more accepted. Typically, when performing an electrolyte solution evaluation for the lithium cell packing material, a packing material sample cut into a strip is dipped in the electrolyte solution at a temperature of 85° C. In order to minimize handling and also include an evaluation of water resistance, a method has been proposed in which the strip sample is washed with water following the electrolyte solution dipping treatment, and subsequently subjected to a water dipping treatment. Moreover, an accelerated test is also sometimes used, in which the dipping treatment at 85° C. is conducted using an electrolyte solution to which several thousand ppm of water has already been added, thereby performing the evaluation under conditions in which hydrofluoric acid already exists.

However, with the lithium cell packing materials disclosed in Patent Documents 1 to 3, the water resistance is not entirely satisfactory. Further, the packing material disclosed in Patent Document 4 also suffers from poor water resistance.

Furthermore, it is thought that lithium cells will not only be useful in miniaturized applications such as the types of portable mobile phones and the like mentioned above, but will also become increasingly important in large-scale applications such as cells for motor vehicles or the like. Motor vehicle applications, in particular, will require improvements in the electrolyte solution resistance, water resistance and hydrofluoric acid resistance beyond current levels.

The most effective known method of imparting these resistance properties is performing a chemical conversion treatment on the aluminum foil, and one example of this type of chemical conversion treatment is a chromate treatment.

For example, Patent Document 5 discloses a multitude of chromate treatments, including coating type chromate treatments and chromate treatments that employ dipping methods.

Further, in all manner of chemical conversion treatments not limited to chromate treatments, the aluminum foil may be imparted with an etching function so that the aluminum foil and the chemical conversion treatment layer formed by the chemical conversion treatment adopt a graded structure. In order to achieve this effect, any of the various inorganic acids such as hydrochloric acid, sulfuric acid, nitric acid, phosphoric acid and hydrofluoric acid, or salts thereof, may be used as treatment agents.

However, in the type of chromate treatment disclosed in Patent Document 5, the hexavalent chromium used as the main component of the treatment material has been identified as an environmental toxin, and although it exhibits favorable functionality, the material is unattractive from an environmental perspective. As a result, trivalent chromium has become widely used, but achieving the same effect as that observed for hexavalent chromium is difficult, and as long as chromium continues to be used, chromate treatments will remain undesirable from an environmental point of view.

Furthermore, the treatment agents used during chemical conversion treatments often cause corrosion of the coating apparatus, which not only places limitations on the coating apparatus, but also tends to result in a deterioration in the operating environment.

Moreover, in order to improve the adhesion of these treatment agents, a dipping treatment in an acid bath or alkali bath, and steps for performing degreasing or etching may be included within the production steps for the cell packing material. However, although these steps are necessary in term of imparting favorable electrolyte solution resistance, the treatment cost is high, and the steps tend to be rate-limiting in terms of the production of the cell packing material, meaning a significant simplification of the production steps is currently required.

[Patent Document 1]
Japanese Unexamined Patent Application, First Publication No. 2001-243928
[Patent Document 2]
Japanese Unexamined Patent Application, First Publication No. 2004-42477
[Patent Document 3]
Japanese Unexamined Patent Application, First Publication No. 2004-142302
[Patent Document 4]
Japanese Unexamined Patent Application, First Publication No. 2002-187233
[Patent Document 5]
Japanese Unexamined Patent Application, First Publication No. 2002-144479

DISCLOSURE OF INVENTION

Problems to be Solved by the Invention

The present invention takes the above circumstances into consideration, with an object of providing a packing material for a lithium cell that has no impact from an environmental perspective, enables a simplification of the production steps, and exhibits excellent electrolyte solution resistance, hydrofluoric acid resistance and water resistance, as well as providing a production method for the packing material.

Means to Solve the Problems

A packing material for a lithium cell according to the present invention includes a first adhesive layer, an aluminum foil layer, a coating layer, an adhesive resin layer or a second adhesive layer, and a sealant layer laminated sequentially on one surface of a base material layer, wherein the coating layer includes a layer (A) in which 1 to 100 parts by mass of a phosphoric acid or a phosphate has been blended into 100 parts by mass of a rare earth element-based oxide.

In the packing material for a lithium cell according to the present invention, the coating layer is preferably a multilayer structure that includes the above layer (A), and a layer (B) containing a cationic polymer and a cross-linking agent that causes cross-linking of the cationic polymers.

Further, the relationship between the mass (a) per unit surface area ($g/m^2$) of the layer (A), and the mass (b) per unit surface area ($g/m^2$) of the layer (B) preferably satisfies the expression $2 \geq b/a$.

Furthermore, the cationic polymer is preferably at least one polymer selected from the group consisting of polyethyleneimines, ionic polymer complexes made of a polyethyleneimine and a polymer having carboxylic acid groups, primary amine-grafted acrylic resins having a primary amine grafted to the main acrylic backbone, polyallylamines and derivatives thereof, and aminophenols.

Moreover, the cross-linking agent is preferably at least one material selected from the group consisting of compounds having an isocyanate group, a glycidyl group, a carboxyl group or an oxazoline group as a functional group, and silane coupling agents.

Furthermore the layer (A) is preferably laminated directly onto the aluminum foil layer.

The mass (a) per unit surface area of the layer (A) is preferably within a range from 0.010 to 0.200 $g/m^2$.

Furthermore, the rare earth element-based oxide is preferably cerium oxide.

Moreover, the phosphoric acid or phosphate mentioned above is preferably a condensed phosphoric acid or a condensed phosphate.

Furthermore, the adhesive resin layer is preferably composed of (i) or (ii) below, whereas the second adhesive layer is preferably composed of (iii) below.

(i) an acid-modified polyolefin-based resin ($\alpha$).

(ii) a resin composition in which an acid-modified polyolefin-based resin ($\alpha$) (30 to 99% by mass) is combined with an isocyanate compound or derivative thereof ($\beta$) and a silane coupling agent ($\gamma$) (($\beta$)+($\gamma$):1 to 70% by mass), provided that if ($\beta$)+($\gamma$) is deemed to be 100, then ($\beta$):($\gamma$)=10 to 90:90 to 10.

(iii) a polyurethane-based adhesive containing a polyol component as the main component, and also containing an isocyanate compound or derivative thereof as a curing agent.

A production method for a packing material for a lithium cell according to the present invention includes sequentially laminating a first adhesive layer, an aluminum foil layer, a coating layer, an adhesive resin layer or a second adhesive layer, and a sealant layer onto one surface of a base material layer, wherein the coating layer is laminated on top of the aluminum foil layer by applying a coating composition (A), which contains a rare earth element-based oxide and 1 to 100 parts by mass of a phosphoric acid or a phosphate per 100 parts by mass of the rare earth element-based oxide, onto the aluminum foil layer, and subsequently drying the coating composition to form a layer (A).

In the production method for a packing material for a lithium cell according to the present invention, the coating layer is preferably laminated on top of the aluminum foil layer by further applying a coating composition (B), which contains a cationic polymer and a cross-linking agent that causes cross-linking of the cationic polymers, onto the above layer (A), and subsequently drying the coating composition to form a layer (B).

EFFECT OF THE INVENTION

The present invention is able to realize a packing material for a lithium cell that has no impact from an environmental perspective, enables a simplification of the production steps, and exhibits excellent electrolyte solution resistance, hydrofluoric acid resistance and water resistance, as well as a production method for the packing material.

DESCRIPTION OF THE REFERENCE SYMBOLS

10, 20, 30: Packing material for a lithium cell, 11: Base material layer, 12: First adhesive layer, 13: Aluminum foil layer, 14: Coating layer, 14a: Layer (A), 14b: Layer (B), 14c: Layer (C), 15: Adhesive resin layer, 15a: Second adhesive layer, and 16: Sealant layer

BEST MODE FOR CARRYING OUT THE INVENTION

A more detailed description of the present invention is presented below.

First Embodiment

Figure 1:
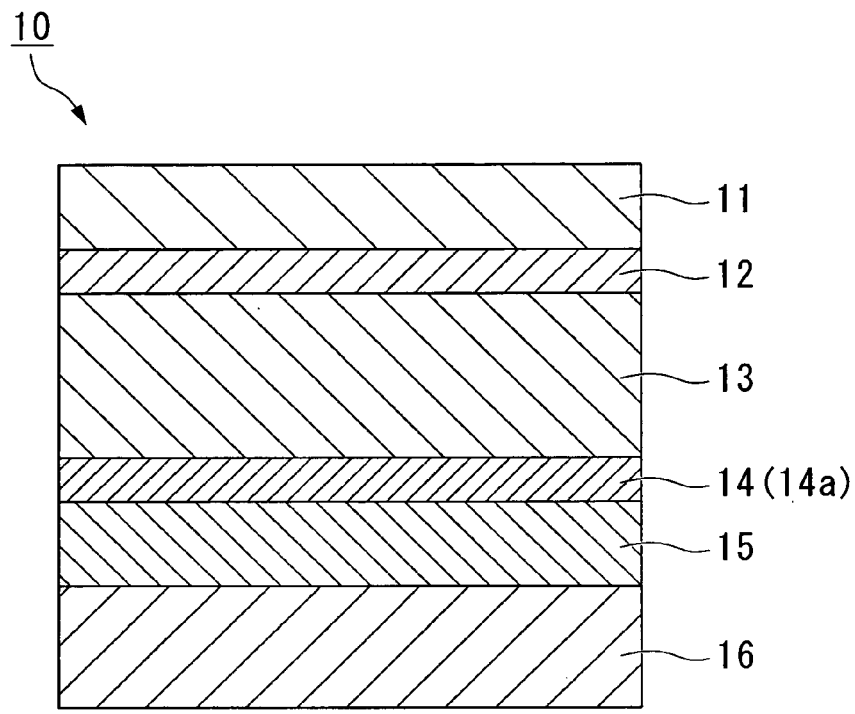
FIG. 1 is a cross-sectional view illustrating one example of a packing material for a lithium cell according to the present invention.

FIG. 1 is a cross-sectional view illustrating a first embodiment of a packing material for a lithium cell according to the present invention. The lithium cell packing material 10 illustrated in FIG. 1 includes a first adhesive layer 12, an aluminum foil layer 13, a coating layer 14, an adhesive resin layer 15, and a sealant layer 16 laminated sequentially on one surface of a base material layer 11.
<Coating Layer>

The coating layer 14 shown in FIG. 1 is composed of a layer (A) 14a in which 1 to 100 parts by mass of a phosphoric acid or a phosphate has been blended into 100 parts by mass of a rare earth element-based oxide (hereafter, this layer is frequently referred to as "layer (A)").

The lithium cell packing material should preferably be investigated with due consideration of all manner of situations.

For example, many outer jacket materials for lithium cells are formed using cold molding methods. Minor defects or pinholes or the like generated as a result of friction between the molding die and the adhesive resin layer/sealant layer during the molding process may potentially allow the aluminum foil layer that functions as an intermediate layer within the lithium cell packing material to make direct contact with the electrolyte solution. Accordingly, an action that protects the aluminum foil under more severe evaluation conditions is desirable.

As a result of performing intensive investigation relating to the corrosion of aluminum foils, the inventors of the present invention discovered that a rare earth element-based oxide could be used as a material that yielded a corrosion prevention effect (inhibitor effect) for aluminum foil that was similar to the effect obtained by conducting a conventional chromate treatment, and yet was also environmentally favorable.
(Rare Earth Element-Based Oxide)

Examples of the rare earth element-based oxide include cerium oxide, yttrium oxide, neodymium oxide and lanthanum oxide. Of these, cerium oxide is preferred.

In the present invention, during formation of the layer (A) 14a, a phosphoric acid or a phosphate may be used as a dispersion stabilizer, so that the rare earth element-based oxide is dispersed in a stable manner to form a sol-like state (a rare earth element-based oxide sol). In this type of case, a rare earth element-based oxide sol in which the average particle size is not more than 100 nm is preferred. In the rare earth element-based oxide sol, various solvents such as water-based solvents, alcohol-based solvents, hydrocarbon-based solvents, ketone-based solvents, ester-based solvents or ether-based solvents may be used, although using a water-based rare earth element-based oxide sol is particularly desirable.

As the dispersion stabilizer mentioned above, besides a phosphoric acid or a phosphate, other inorganic acids such as nitric acid and hydrochloric acid, and organic acids such as acetic acid, malic acid, ascorbic acid or lactic acid may also be used, although a phosphoric acid or a phosphate is particularly preferred as the dispersion stabilizer. By using a phosphoric acid or a phosphate as the dispersion stabilizer, not only can the rare earth element-based oxide be dispersed in a stable manner, but other advantages can also be expected, including an improvement in the adhesion to the aluminum foil due to the aluminum chelating ability of the phosphoric acid, improved electrolyte solution resistance due to capture of aluminum ions eluted under the effect of hydrofluoric acid (that is, formation of a passive state), and an improvement in the cohesive strength of the layer (A) 14a due to the fact that dehydration condensation of the phosphoric acid occurs readily even at low temperatures. As a result of this improvement in the cohesive strength, the strength properties of the lithium cell packing material tend to improve.

Examples of the phosphoric acid or phosphoric acid compound such as a phosphate include orthophosphoric acid, pyrophosphoric acid, metaphosphoric acid, and alkali metal salts or ammonium salts of these phosphoric acids. Further, various other salts such as aluminum phosphate and titanium phosphate may also be used. Moreover, condensed phosphoric acids such as trimetaphosphoric acid, tetrametaphosphoric acid, hexametaphosphoric acid and ultrametaphosphoric acid, and the alkali metal salts or ammonium salts of these condensed phosphoric acids (namely, condensed phosphates) are particularly preferred in terms of the functions obtained. Particularly in those cases where the layer (A) 14a is formed using a sol-like rare earth element-based oxide (that is, a rare earth element-based oxide sol), if due consideration is given to the dry film formation properties (namely, the drying capabilities and the amount of heat required), then a dispersion stabilizer that exhibits excellent reactivity at low temperatures is preferred. Accordingly, in terms of the phosphate salt, Na ion salts are particularly desirable as they exhibit excellent dehydration condensation properties at low temperature. Furthermore, water-soluble salts are preferred.

The layer (A) 14a is formed by blending 1 to 100 parts by mass of the phosphoric acid or phosphate with 100 parts by mass of the rare earth element-based oxide mentioned above. The blend amount of the phosphoric acid or phosphate is preferably within a range from 5 to 50 parts by mass, and is more preferably from 5 to 20 parts by mass. If the blend amount of the phosphoric acid or phosphate is smaller than the lower limit of the above-mentioned range, then the stability of the resulting rare earth element-based oxide sol tends to deteriorate, and the functionality of the layer tends to be inadequate for a lithium cell packing material. In contrast, if the blend amount is greater than the upper limit of the above range, then the functionality of the rare earth element-based oxide sol tends to decrease.

As described above, in those cases where a phosphate is used as the dispersion stabilizer, a Na ion salt is preferred as the phosphate salt, but if the blend amount of the phosphate exceeds the upper limit of the above-mentioned range, then needless to say, the types of problems described above will occur.

In this manner, by blending a phosphorus compound with the rare earth element-based oxide, not only can the dispersion of the rare earth element-based oxide be stabilized, but an inhibitor effect that suppresses corrosion of the aluminum foil can also be obtained. Furthermore, adhesion of the phosphoric acid compound to the aluminum foil can also be improved, and a synergistic effect yields favorable electrolyte solution resistance.

According to the present invention, by forming the coating layer 14 from the layer (A) 14a, as illustrated in FIG. 1, a typical coating method can be used to obtain a corrosion inhibiting effect for metal foils such as aluminum foil, without the use of environmental toxins such as hexavalent chromium.

However, in usual chemical conversion treatments typified by chromate treatments, a graded structure is formed between the aluminum foil layer and the chemical conversion treatment layer. As a result, the aluminum foil is often treated using a chemical conversion treatment agent containing a blend of hydrofluoric acid, hydrochloric acid, nitric acid, sulfuric acid, or salts of these acids, meaning both chromium-based and non-chromium-based compounds act upon the aluminum foil to form the chemical conversion treatment layer on the foil. One example of the chemical conversion treatment is a phosphoric acid chromate treatment, and the basic principles of this treatment are the same regardless of whether a dipping treatment or a coating treatment using a resin binder is performed. However, because these chemical conversion treatment agents use acids, they tend to cause corrosion of the operating environment and the coating apparatus.

In contrast, with the type of coating layer described above that is used in the present invention, a graded structure need not be formed on the aluminum foil, and in that regard, the layer differs from the normal definition of a chemical conversion treatment. As a result, there are no particular restrictions on the state of the coating agent, which may be acidic, alkaline or neutral.

In the present invention, although there are no particular restrictions on the thickness of the coating layer 14 shown in FIG. 1, a thickness of 0.01 to 10 μm is preferred.

The mass (a) per unit surface area of the coating layer 14, namely the layer (A) 14a, is preferably within a range from 0.010 to 0.200 g/m$^2$, and is more preferably from 0.040 to 0.100 g/m$^2$. If this mass (a) is less than the lower limit of the above-mentioned range, then the absolute amounts of the rare earth element-based oxide having the aluminum foil corrosion inhibiting effect, and the phosphoric acid or phosphate become too small, and achieving the desired electrolyte solution resistance and hydrofluoric acid resistance may be difficult. On the other hand, if the mass (a) is greater than the upper limit of the above range, then the sol-gel reaction that accompanies drying of the rare earth element-based oxide sol used in the present invention tends to proceed poorly (in other words, insufficient heat causes the sol-gel reaction to proceed poorly), and the cohesive strength of the rare earth element-based oxide sol tends to decrease, causing a deterioration in the strength properties when used as a packing material for a lithium cell. Accordingly, provided the mass (a) per unit surface area of the layer (A) 14a is within the above-mentioned range, electrolyte solution resistance is maintained, and the cohesive strength of the rare earth element-based oxide sol can be maintained, thus ensuring the level of strength required for a lithium cell packing material.

<Aluminum Foil Layer>

Typical flexible aluminum foil may be used as the material for the aluminum foil layer, although in order to ensure more favorable pinhole resistance and impart superior spreadability during molding, the use of an aluminum foil that contains iron is preferred. The iron content within 100% by mass of the aluminum foil is preferably within a range from 0.1 to 9.0% by mass, and is more preferably from 0.5 to 2.0% by mass. If the iron content is less than the lower limit of the above-mentioned range, then the desired levels of pinhole resistance and spreadability may not be achieved, whereas if the iron content is greater than the upper limit of the above range, then the flexibility of the foil may be lost.

Further, considering factors such as the barrier properties, pinhole resistance and workability, the thickness of the aluminum foil layer 13 shown in FIG. 1 is preferably within a range from 9 to 200 μm, and is more preferably from 15 to 100 μm.

As the aluminum foil, an untreated aluminum foil may be used, but in terms of imparting superior resistance to the electrolyte solution, the use of an aluminum foil that has undergone a degreasing treatment is preferred. Degreasing treatments can be broadly classified as wet or dry treatments.

Examples of wet treatments include acid degreasing and alkali degreasing treatments. Examples of the acids used in acid degreasing include inorganic acids such as sulfuric acid, nitric acid, hydrochloric acid and hydrofluoric acid, and these acids may be used individually or in combinations of two or more different acids. Further, from the viewpoint of improving the etching effect of the aluminum foil, various metal salts that can act as supply sources for Fe ions or Ce ions may also be added if required. Examples of the alkali used in alkali degreasing include powerful etching type alkalis such as sodium hydroxide. Further, treatment agents containing weaker alkalis or surfactants or the like may also be used. These degreasing treatments are conducted by dipping methods or spraying methods.

One example of a dry treatment is a degreasing treatment conducted by annealing the aluminum.

Furthermore, in addition to the treatments described above, other degreasing treatments include flame treatments and corona treatments. Moreover, degreasing treatments in which active oxygen generated by the irradiation of ultraviolet light of a specific wavelength is used to oxidatively decompose and remove contaminants may also be used.

In the present invention, a satisfactory level of electrolyte solution resistance can be imparted with a dry degreasing treatment, and there is no necessity to perform the type of wet degreasing treatments or etching level treatments described above. In other words, the annealing treatment performed to improve the flexibility of the aluminum foil yields a simultaneous degreasing treatment action that is able to impart satisfactory electrolyte solution resistance to the foil. As mentioned above, this characteristic is due to the fact that the coating layer 14 is composed of the layer (A) 14*a*. This effect is particularly pronounced when a rare earth element-based oxide sol that has been stably dispersed using phosphoric acid or a phosphate is used as the rare earth element-based oxide.

<Adhesive Resin Layer>

Figure 2:
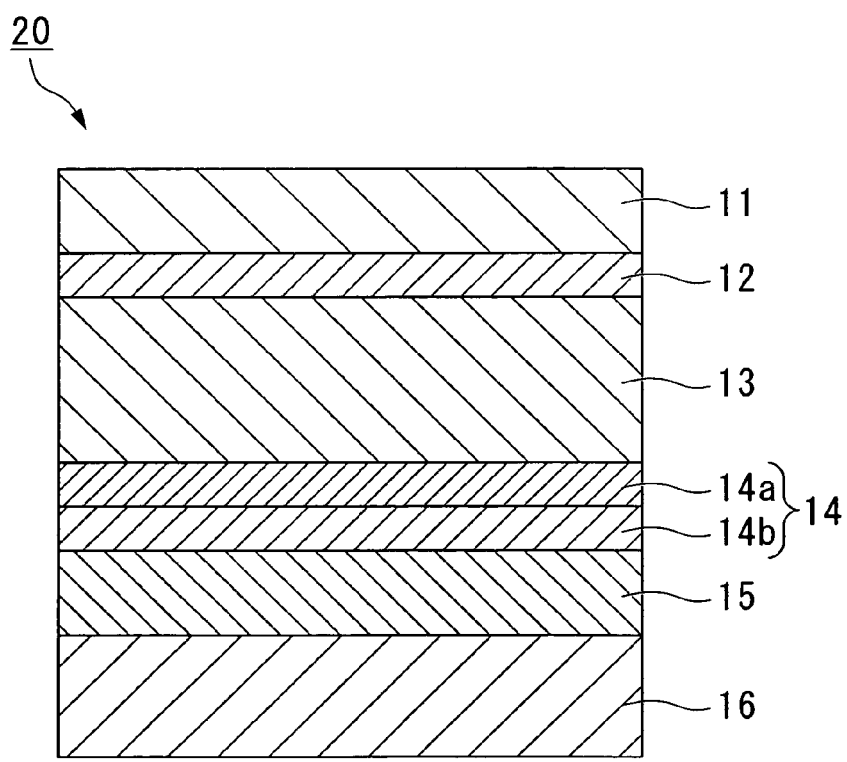
FIG. 2 is a cross-sectional view illustrating another example of a packing material for a lithium cell according to the present invention.
Figure 3:
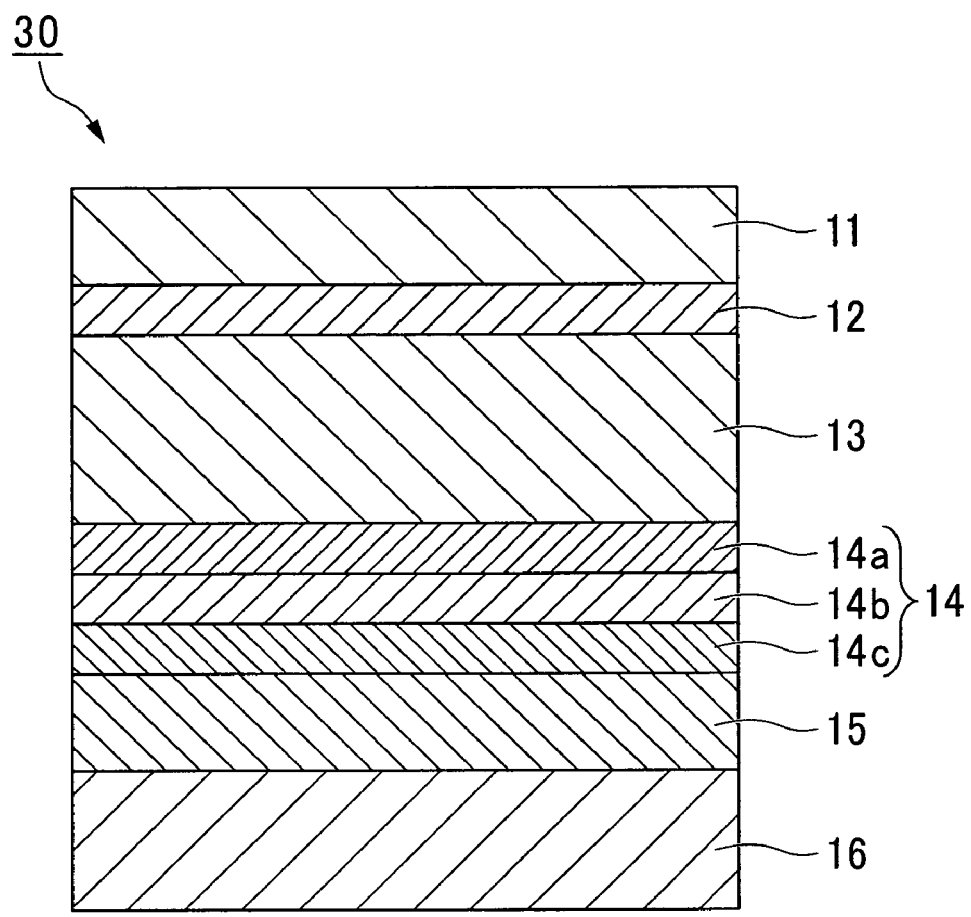
FIG. 3 is a cross-sectional view illustrating another example of a packing material for a lithium cell according to the present invention.

The structures illustrated in FIG. 1 to FIG. 3 are structures that have an adhesive resin layer 15 provided between the coating layer 14 and the sealant layer 16, and are produced by either an extrusion lamination method or a thermal lamination method. The adhesive resin layer 15 is preferably composed of (i) or (ii) below. Furthermore, the thickness of the adhesive resin layer 15 is preferably within a range from 1 to 40 μm, and is more preferably from 5 to 20 μm.

(i) an acid-modified polyolefin-based resin (α).

(ii) a resin composition in which an acid-modified polyolefin-based resin (α) (30 to 99% by mass) is combined with an isocyanate compound or derivative thereof (β) and a silane coupling agent (γ) ((β)+(γ):1 to 70% by mass), provided that the mass ratio between the isocyanate compound or derivative thereof (β) and the silane coupling agent (γ), for the case where (β)+(γ) is deemed to be 100, satisfies (β):(γ)=10 to 90:90 to 10. It should be noted that (α)+{(β)+(γ)}=100% by mass.

In those cases where the adhesive resin layer 15 is of the above structure (ii), if the proportion of the acid-modified polyolefin-based resin (α) exceeds 99% by mass, then the electrolyte solution resistance tends to deteriorate, whereas if the proportion is less than 30% by mass, then the adhesion to the sealant layer 16 described below tends to deteriorate. The proportion of the acid-modified polyolefin-based resin (α) is preferably within a range from 60 to 80% by mass.

On the other hand, if the mass ratio between the isocyanate compound or derivative thereof (β) and the silane coupling agent (γ) falls outside the above-mentioned range, then the electrolyte solution resistance tends to worsen. The mass ratio (β):(γ) is preferably 50 to 80:80 to 50.

As the acid-modified polyolefin-based resin (α), an acid-modified polyolefin resin produced by grafting maleic anhydride or the like onto a polyolefin resin is preferred. Examples of the polyolefin resin include low-density, medium-density and high-density polyethylene; copolymers of ethylene and an α-olefin; homo-, block or random polypropylenes; and copolymers of propylene and an α-olefin. These polyolefin resins may be used individually or in combinations of two or more different resins. Furthermore, the resin may be used in the form of a dispersion within an organic solvent, and this facilitates the blending of various additives effective in improving the adhesion, as well as the isocyanate compound or derivative thereof (β) and the silane coupling agent (γ) described below.

Examples of the isocyanate compound or derivative thereof (β) include diisocyanates such as tolylene diisocyanate, xylylene diisocyanate, and hydrogenation products thereof; hexamethylene diisocyanate, 4,4'-diphenylmethane diisocyanate and hydrogenation products thereof; and isophorone diisocyanate; as well as adducts prepared by reacting the above diisocyanates with a polyhydric alcohol such as trimethylolpropane, and biurets obtained by reacting the above diisocyanates with water; polyisocyanates such as isocyanurates (which are trimers), and blocked polyisocyanates in which these polyisocyanates are blocked with an alcohol, a lactam or an oxime or the like.

These isocyanate compounds or derivatives thereof (β) may be used in either an organic solvent-based form or a water-based form.

Examples of the silane coupling agent (γ) include vinyltriethoxysilane, vinyltris(β-methoxyethoxy)silane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopropyltrimethoxysilane, γ-aminopropyltriethoxysilane, N-β-(aminoethyl)-γ-aminopropyltrimethoxysilane, and γ-isocyanatopropyltriethoxysilane.

The silane coupling agent (γ) preferably contains functional groups that exhibit favorable reactivity with the acid-modified polyolefin-based resin (α). From this viewpoint, the use of an epoxysilane or aminosilane as the silane coupling agent (γ) is preferred, and an isocyanatosilane may also be used, although the reactivity tends to be lower.

<Adhesive Layer>

Figure 4:
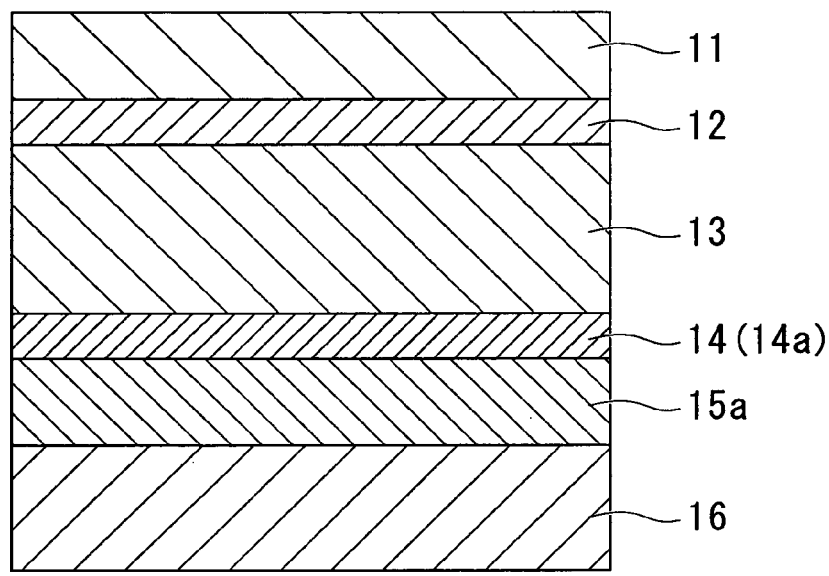
FIG. 4 is a cross-sectional view illustrating one example of a packing material for a lithium cell according to the present invention that includes a dry laminate structure.
Figure 5:
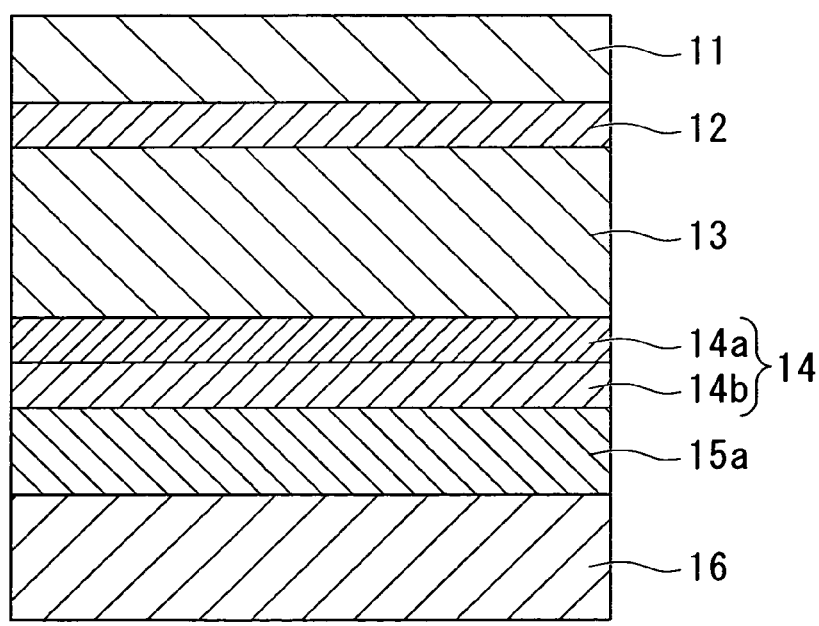
FIG. 5 is a cross-sectional view illustrating another example of a packing material for a lithium cell according to the present invention that includes a dry laminate structure.
Figure 6:
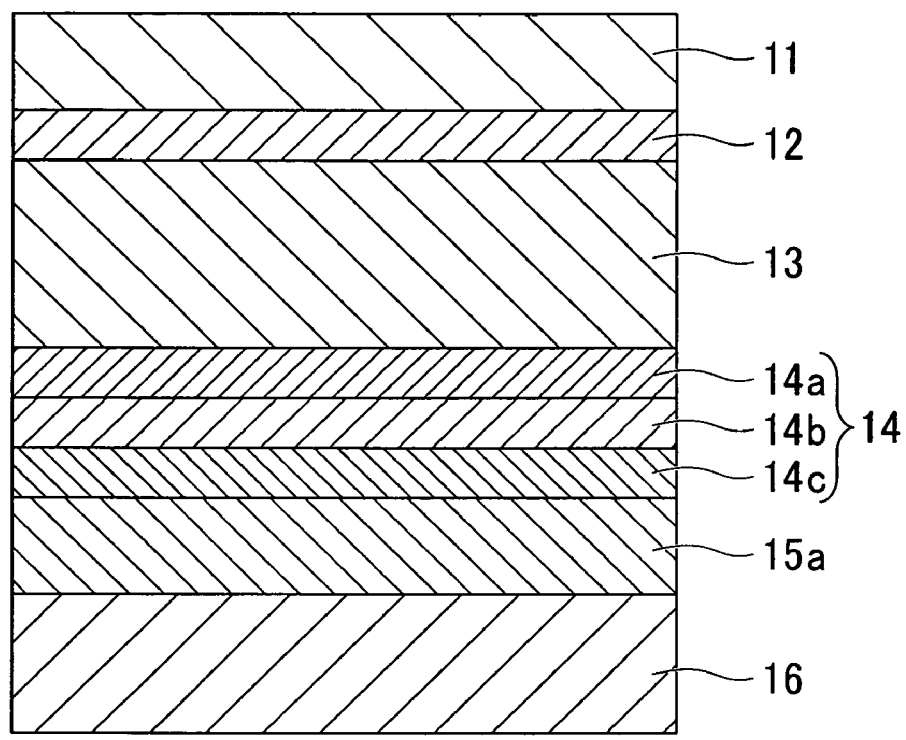
FIG. 6 is a cross-sectional view illustrating another example of a packing material for a lithium cell according to the present invention that includes a dry laminate structure.

The structures illustrated in FIG. 4 to FIG. 6 are structures that have a second adhesive layer 15*a* provided between the coating layer 14 and the sealant layer 16, and are produced by a dry lamination method. Examples of the material used for the second adhesive layer 15*a*, and for the first adhesive layer 12 provided between the base material layer 11 and the aluminum foil layer 13 in FIG. 1 to FIG. 3, include polyurethane-based adhesives containing any of various polyols as the main component, and containing an isocyanate compound or derivative thereof as a curing agent component.

Examples of the polyol that functions as the main component include polyester polyols, polyether polyols, polycarbonate polyols, acrylic polyols, and polyolefin polyols. Specific examples of polyester polyols include compounds obtained using one or more aliphatic dibasic acids such as succinic acid, glutaric acid, adipic acid, pimelic acid, suberic acid, azelaic acid, sebacic acid or brassylic acid, and/or aromatic dibasic acids such as isophthalic acid, terephthalic acid or naphthalenedicarboxylic acid, with one or more aliphatic diols such as ethylene glycol, propylene glycol, butanediol, neopentyl glycol, methylpentanediol, hexanediol, heptanediol, octanediol, nonanediol, decanediol or dodecanediol, and/or alicyclic diols such as cyclohexanediol or hydrogenated xylylene glycol, and/or aromatic diols such as xylylene glycol. Furthermore, polyurethane polyols in which chain extensions have been performed at hydroxyl groups within the above polyols using an isocyanate compound may also be used.

Examples of the isocyanate compound or derivative thereof that functions as the curing agent component include the same materials as those listed above in the section relating to the <adhesive resin layer>. Usually, a polyurethane-based adhesive used for a dry lamination process need only include the above main component and curing agent in the basic composition, although other additives may also be added to improve various adhesion properties or impart various resistance properties. Examples of these additives include carbodiimide compounds, oxazoline compounds, epoxy compounds, phosphorus-based compounds, and silane coupling agents.

The thicknesses of the first adhesive layer 12 and the second adhesive layer 15a shown in FIG. 1 to FIG. 6 are preferably within a range from 1 to 10 μm, and more preferably from 3 to 7 μm. Further, the first adhesive layer 12 and the second adhesive layer 15a may be composed of the same type of polyurethane-based adhesive, or may be composed of different polyurethane-based adhesives.

<Sealant Layer>

Examples of the components that constitute the sealant layer 16 illustrated in FIG. 1 include polyolefin resins, and acid-modified polyolefin resins produced by grafting maleic anhydride or the like onto a polyolefin resin. The polyolefin resin may use one or more resins selected from the various polyolefin resins exemplified above in the description relating to the adhesive resin layer.

Further, the sealant layer 16 may be a single layer film, or a multilayer film produced by laminating a plurality of layers together. For example, depending on the functionality required, a multilayer film containing an interposed film of a resin such as an ethylene-cyclic olefin copolymer or a polymethylpentene may be used to impart improved moisture resistance.

Furthermore, various additives may also be blended into the sealant layer 16, including flame retardants, slip agents, anti-blocking agents, antioxidants, photostabilizers and tackifiers.

The thickness of the sealant layer 16 is preferably within a range from 10 to 100 μm, and is more preferably from 20 to 50 μm.

<Base Material Layer>

The base material layer 11 illustrated in FIG. 1 is provided for the purposes of imparting heat resistance during the sealing step of the lithium cell production, and preventing pinholes from occurring during processing or distribution. A resin layer having insulating properties is preferably used as the base material layer 11. Examples of resins that may be used include oriented or non-oriented polyester films, polyamide films and polypropylene films. Further, these films may be used as a single layer, or as a multilayer film prepared by laminating two or more layers. In terms of improving properties such as the moldability, heat resistance, pinhole resistance and insulation, an oriented polyamide film or oriented polyester film is ideal.

The thickness of the base material layer 11 is preferably within a range from 6 to 40 μm, and is more preferably from 10 to 25 μm. If the thickness of the base material layer 11 is less than the above-mentioned range, then the pinhole resistance and insulation properties tend to deteriorate. In contrast, if the thickness exceeds the above range, then the layer becomes difficult to mold.

<Production Method for Packing Material for Lithium Cell>

Next is a description of a production method for the lithium cell packing material 10 of the present invention illustrated in FIG. 1, although the present invention is not restricted to the production method described below.

(Lamination of Coating Layer to Aluminum Foil Layer)

A coating composition (A) containing a rare earth element-based oxide and a phosphoric acid or phosphate in an amount of 1 to 100 parts by mass per 100 parts by mass of the rare earth element-based oxide is coated onto the aluminum foil layer 13, and subsequently subjected to drying, curing and baking to form the layer (A) 14a. In this manner, a coating layer 14 composed of the layer (A) 14a is laminated on top of the aluminum foil layer 13.

The coating liquid (namely, the coating composition (A)) contains the phosphoric acid or phosphate as a sol stabilizer. By utilizing this phosphoric acid or phosphate, additional functionality, namely an improved aluminum corrosion prevention effect can be expected.

In terms of the coating method, conventional methods may be used, including gravure coaters, gravure reverse coaters, roll coaters, reverse roll coaters, die coaters, bar coaters, kiss coaters and comma coaters.

As described above, the aluminum foil layer 13 may use either an untreated aluminum foil, or an aluminum foil that has been subjected to a wet or dry degreasing treatment.

(Bonding of Base Material Layer and Aluminum Foil Layer)

The aluminum foil layer 13 having the coating layer 14 laminated thereon, and the base material layer 11 are bonded together. Using dry lamination, non-solvent lamination or wet lamination or the like as the bonding method, the two components are bonded together using the adhesive described above, thus preparing a laminate having a structure represented by base material layer 11/first adhesive layer 12/aluminum foil layer 13/coating layer 14.

(Lamination of Sealant Layer)

The sealant layer 16 is laminated on top of the laminate described above. Examples of the method used for this lamination include dry processes and wet processes.

In the case of a dry process, an adhesive resin is extrusion laminated onto the surface of the coating layer 14 of the laminate, and the sealant layer 16 that has been prepared by an inflation method or casting method is then laminated onto the adhesive resin, thus producing the lithium cell packing material 10. The coating layer 14 may be provided in-line during the above extrusion lamination process. Subsequently, a heat treatment (such as an aging treatment or thermal lamination treatment) may be performed to improve the adhesion between the coating composition and the adhesive resin, although in the present invention, by employing the type of layered structure described above, a lithium cell packing material 10 having excellent adhesion can be obtained with the small amount of heat applied during the extrusion lamination.

Furthermore, an inflation method or casting method may be used to prepare a multilayer film composed of the adhesive resin and the sealant layer 16, with this multilayer film then laminated onto the above laminate via a thermal lamination process.

In the case of a wet process, a dispersion of the acid-modified polyolefin-based resin ($\alpha$) is coated onto the surface of the coating layer 14 of the above laminate, the solvent is volatilized at a temperature not less than the melting point of the acid-modified polyolefin-based resin ($\alpha$), thereby melt-softening and baking the resin. Subsequently, the sealant layer 16 is laminated via a heat treatment such as thermal lamination, thus producing the lithium cell packing material 10.

Examples of the coating method include the various coating methods exemplified above in the description of the lamination of the coating layer to the aluminum foil layer.

Second Embodiment

FIG. 2 is a cross-sectional view illustrating a second embodiment of a lithium cell packing material 20 according to the present invention. This embodiment is described below in detail. In FIG. 2, those structural components that are the <Coating Layer>

The coating layer 14 of the embodiment shown in FIG. 2 is a multilayer structure including a layer (A) 14a and a layer (B) 14b containing a cationic polymer and a cross-linking agent that causes cross-linking of the cationic polymers (hereafter, this layer is referred to as "layer (B)"). The rare earth element-based oxide and the phosphoric acid or phosphate are the same as the rare earth element-based oxide and the phosphoric acid or phosphate described in the first embodiment.

(Cationic Polymer)

As a result of performing intensive investigation using all manner of compounds with the aim of improving the electrolyte solution resistance and hydrofluoric acid resistance to the levels required for lithium cell packing materials, the inventors of the present invention discovered that cationic polymers exhibited excellent electrolyte solution resistance and hydrofluoric acid resistance. It is surmised that the reasons for these superior resistance properties include the trapping of fluorine ions by the cationic groups (namely, an anion catcher), thereby suppressing damage to the aluminum foil.

Examples of the cationic polymer include polymers that contain amines, and of such polymers, polyethyleneimines, ionic polymer complexes made of a polyethyleneimine and a polymer having carboxylic acid groups, primary amine-grafted acrylic resins having a primary amine grafted to the main acrylic backbone, polyallylamines and derivatives thereof, and aminophenols are preferred. Polyallylamines and derivatives thereof are particularly desirable.

Examples of polymers having carboxylic acid groups that form ionic polymer complexes with a polyethyleneimine include polycarboxylic acid (or salts) such as polyacrylic acids or ion salts thereof, or copolymers obtained by introducing a comonomer into such a polycarboxylic acid (or salt), and carboxyl group-containing polysaccharides such as carboxymethylcellulose or ion salts thereof.

As the polyallylamine, homopolymers or copolymers of allylamine, allylamine amide sulfate, diallylamine and/or dimethylallylamine and the like may be used. These amines may be either free amines, or stabilized amines that have been stabilized using acetic acid or hydrochloric acid. Furthermore, maleic acid or sulfur dioxide or the like may also be used as copolymer components. Moreover, polymers in which a portion of the primary amines have been methoxylated to impart thermal cross-linking properties may also be used.

In the case of an aminophenol, compounds in which a portion of the primary amines have been methoxylated to impart thermal cross-linking properties may also be used.

Any of these cationic polymers may be used individually, or two or more different polymers may be used in combination.

These types of cationic polymers are effective materials for lithium cell packing materials, and by combining the layer (B) containing the cationic polymer with the layer (A) described above, even greater improvements in functionality can be expected.

However, if consideration is given to the fact that the lithium cell packing material is dipped in water during evaluation of the water resistance, then the coating layer 14 requires water resistance and resistance of adhesion to water to act as an anchor coating agent. Although a cationic polymer containing cationic groups such as amines is effective in terms of hydrofluoric acid resistance, because it is water-based, the use of a cationic polymer by itself tends to result in inferior water resistance.

Accordingly, the inventors of the present invention conducted intensive investigation of the problem of delamination accompanying the water dipping performed after the electrolyte solution evaluation, and as a result, discovered that the causes of the inferior water resistance exhibited by the cationic polymers were the fact that the cationic polymers actually dissolve in water, and the fact that water resistance problems occurred at the bonding interface. Possible countermeasures to address these causes include adding a cross-linking agent in the former case, and forming interactions at the bonding interface in the latter case, but because one of the reasons for the latter problem is the former problem, it was discovered that addressing the former cause also resolved the latter cause. Based on these findings, the inventors were able to resolve the problem of inferior water resistance.

(Cross-Linking Agent)

Examples of the cross-linking agent used for converting the cationic polymers to a cross-linked structure include at least one material selected from the group consisting of compounds having an isocyanate group, a glycidyl group, a carboxyl group or an oxazoline group as a functional group, and silane coupling agents.

Examples of compounds having an isocyanate group include diisocyanates such as tolylene diisocyanate, xylylene diisocyanate, and hydrogenation products thereof; hexamethylene diisocyanate, 4,4'-diphenylmethane diisocyanate and hydrogenation products thereof; and isophorone diisocyanate; as well as adducts prepared by reacting the above isocyanates with a polyhydric alcohol such as trimethylolpropane, and biurets obtained by reacting the above isocyanates with water; polyisocyanates such as isocyanurates (which are trimers), and blocked polyisocyanates in which these polyisocyanates are blocked with an alcohol, a lactam or an oxime or the like.

Examples of compounds having a glycidyl group include epoxy compounds obtained by the interaction between a glycol such as ethylene glycol, diethylene glycol, triethylene glycol, polyethylene glycol, propylene glycol, dipropylene glycol, tripropylene glycol, polypropylene glycol, 1,4-butanediol, 1,6-hexanediol or neopentyl glycol, and epichlorohydrin; epoxy compounds obtained by the interaction between a polyhydric alcohol such as glycerol, polyglycerol, trimethylolpropane, pentaerythritol or sorbitol, and epichlorohydrin; and epoxy compounds obtained by the interaction between a dicarboxylic acid such as phthalic acid, terephthalic acid, oxalic acid or adipic acid, and epichlorohydrin.

Examples of compounds having a carboxyl group include the various aliphatic or aromatic dicarboxylic acids, as well as poly(meth)acrylic acids, and alkali (or alkaline earth) metal salts of poly(meth)acrylic acids.

Examples of compounds having an oxazoline group include low molecular weight compounds having two or more oxazoline units. Furthermore, in those cases where a polymerizable monomer such as isopropenyloxazoline is used, a copolymer prepared by copolymerization with an acrylic monomer such as (meth)acrylic acid, an alkyl(meth)acrylate or a hydroxyalkyl(meth)acrylate or the like may also be used.

Moreover, as the cross-linking agent, the use of a silane coupling agent that is capable of causing a selective reaction between the amines and the functional groups, and making the cross-linking points be siloxane bonds, is preferred. Examples of the silane coupling agent include γ-glycidoxypropyltrimethoxysilane, γ-glycidoxypropyltriethoxysilane, β-(3,4-epoxycyclohexyl)ethyltrimethoxysilane, γ-chloropropylmethoxysilane, vinyltrichlorosilane, γ-mercaptopyltrimethoxysilane, γ-aminopropyltriethoxysilane, N-β-(aminoethyl)-γ-aminopropyltrimethoxysilane, and γ-isocyanatopropyltriethoxysilane. Considering the level of reactivity with the cationic polymer or copolymer thereof, β-(3,4-epoxycyclohexyl)ethyltrimethoxysilane, γ-aminopropyltriethoxysilane or γ-isocyanatopropyltriethoxysilane is particularly desirable.

These cross-linking agents are typically added in an amount within a range from 1 to 50 parts by mass per 100 parts by mass of the cationic polymer. If the blend amount of the cross-linking agent is less than the lower limit of the above-mentioned range, then the amount of cross-linking may be insufficient. In contrast, if the blend amount is greater than the upper limit of the above range, then the pot life of the coating liquid may deteriorate.

In those cases where the cationic polymer is a polyallylamine derivative in which the primary amines of the polyallylamine have been methoxycarbonylated, because the polymer itself has thermal cross-linking properties, even if a cross-linking agent is not added, the polymer still performs in the same manner as compositions containing a cross-linking agent. Further, as for the method used for cross-linking the cationic polymers, methods that employ cross-linking agents other than those described above may also be used, including methods that use a titanium or zirconium compound as the cross-linking agent to form cross-linked structures such as ionic cross-linking.

The cross-linking agents described above may be used individually, or two or more different cross-linking agents may be used in combination. Further, combinations of a cross-linking agent and a silane coupling agent may also be used.

As described above, the cationic polymer is extremely effective as a trap for hydrofluoric acid. Further, by adding a cross-linking agent, the water resistance can also be improved. Accordingly, including the layer (B) 14b containing a cationic polymer shown in FIG. 2 enables the coating layer 14 to exhibit improved levels of electrolyte solution resistance, hydrofluoric acid resistance and water resistance.

However, the type of cationic polymer-containing layer (B) 14b described above has no function for protecting the aluminum foil from corrosion. Hence, as shown in FIG. 2, by forming the coating layer 14 as a multilayer structure containing the layer (A) 14a in addition to the layer (B) 14b, a corrosion prevention effect can be obtained for metal films such as an aluminum foil.

In those cases where the coating layer 14 is composed solely of the layer (A) 14a as shown in FIG. 1, the layer still exhibits excellent electrolyte solution resistance, hydrofluoric acid resistance and water resistance, but by employing the multilayer structure shown in FIG. 2, the hydrofluoric acid resistance is enhanced even more, providing greater functionality.

Although described in further detail below, the layer (A) 14a is preferably laminated directly onto the aluminum foil layer 13, as illustrated in FIG. 2. Further, because the layer (A) 14a is formed using a sol-like material in which the rare earth element-based oxide has been stably dispersed using a phosphoric acid or a phosphate (namely, a rare earth element-based oxide sol), the layer (A) 14a essentially becomes a structure in which sol particles of the rare earth element-based oxide are closely packed. In contrast, the layer (B) 14b is laminated on top of the layer (A) 14a, and fills any gaps between the closely packed rare earth element-based oxide sol particles. In other words, the coating composition (B) that forms the layer (B) 14b is coated onto the layer (A) 14a while penetrating into any gaps within the layer (A) 14a, thus forming the layer (B) 14b. During this process, the coating composition (B) that penetrates into the gaps in the layer (A) 14a undergoes thermal cross-linking, meaning the layer (B) 14b also has a protective layer type effect for the layer (A) 14a.

In order to enable the layer (B) 14b to exhibit a more effective protective layer type role for the layer (A) 14a, the relationship between the mass (a) per unit surface area (g/m$^2$) of the layer (A), and the mass (b) per unit surface area (g/m$^2$) of the layer (B) preferably satisfies the expression $2 \geq b/a$.

If this relationship (b/a) between the mass values for each layer exceeds the above-mentioned range, then although the layer (B) 14b is still able to perform a protective layer type role for the layer (A) 14a, the proportion of the layer (B) 14b laminated on top of the layer (A) 14a, in addition to the coating composition (B) that fills the gaps in the layer (A) 14a, tends to increase more than is necessary. Rather than existing in isolation, the cationic polymer within the layer (B) 14b tends to exhibit more effective functionality such as electrolyte solution resistance and hydrofluoric acid resistance when complexed with the rare earth element-based oxide and the phosphoric acid or phosphate contained within the layer (A) 14a. Accordingly, if the relationship (b/a) between the mass values for each layer exceeds the above-mentioned range, then the proportion of the cationic polymer that does not form a complex with the rare earth element-based oxide and the phosphoric acid or phosphate contained within the layer (A) 14a, but rather exists in isolation, tends to increase, meaning the desired functions of electrolyte solution resistance and hydrofluoric acid resistance may not manifest satisfactorily, resulting in a deterioration in the electrolyte solution resistance and the hydrofluoric acid resistance. Furthermore, because the coating amount of the coating composition (B) increases, the composition may become more difficult to cure. The drying temperature could simply be set higher or the curing time extended in order to ensure satisfactory curing of the coating composition (B), but this tends to result in a fall in productivity. Accordingly, in terms of maintaining productivity levels, while also ensuring a favorable improvement in the electrolyte solution resistance and the hydrofluoric acid resistance, the relationship (b/a) between the mass values for each layer preferably satisfies $2 \geq b/a$, more preferably satisfies $1.5 \geq b/a \geq 0.01$, and most preferably satisfies $1.0 \geq b/a \geq 0.1$.

The above relationship is based on the mass values for each layer, but provided the specific gravity can be determined for each layer, the relationship may also be reported in terms of the thickness of the coating layer 14.

The mass (a) per unit surface area of the layer (A) 14a is preferably within a range from 0.010 to 0.200 g/m$^2$, and is more preferably from 0.040 to 0.100 g/m$^2$. If the mass (a) is less than the lower limit of this range, then the absolute amounts of the rare earth element-based oxide having the aluminum foil corrosion inhibiting effect, and the phosphoric acid or phosphate become too small, and achieving the desired electrolyte solution resistance and hydrofluoric acid resistance may be difficult. On the other hand, if the mass (a) is greater than the upper limit of the above range, then the sol-gel reaction that accompanies drying of the rare earth element-based oxide sol used in the present invention tends to proceed poorly (in other words, insufficient heat causes the sol-gel reaction to proceed poorly), and the cohesive strength of the rare earth element-based oxide sol tends to decrease, causing a deterioration in the strength properties when used as a packing material for a lithium cell. Accordingly, provided the mass (a) per unit surface area of the layer (A) 14a is within the above-mentioned range, electrolyte solution resistance is maintained, and the cohesive strength of the rare earth element-based oxide sol can be maintained, thus ensuring the level of strength required for a lithium cell packing material.

<Production Method for Packing Material for Lithium Cell>

Next is a description of a production method for the lithium cell packing material 20 of the present invention illustrated in FIG. 2, although the present invention is not restricted to the production method described below.

When producing a lithium cell packing material 20 such as that shown in FIG. 2 in which the coating layer 14 is a multilayer structure, the layer (A) 14a is preferably laminated directly onto the aluminum foil layer 13. By laminating the layer (A) 14a directly on top of the aluminum foil layer 13, corrosion of the aluminum foil layer 13 can be better suppressed.

Accordingly, in the step of laminating the coating layer onto the aluminum foil layer, the layer (A) 14a is first formed on top of the aluminum foil layer 13 in the same manner as the method described for the first embodiment. Subsequently, the coating composition (B) containing the cationic polymer and the cross-linking agent that causes cross-linking of the cationic polymers is coated onto the layer (A) 14a, and is then subjected to drying, curing and baking to form the layer (B) 14b. In this manner, a coating layer 14 composed of the layer (A) 14a and the layer (B) 14b is laminated on top of the aluminum foil layer 13.

The steps of bonding the base material layer to the aluminum foil layer, and laminating the sealant layer are then conducted in the same manner as the production method for the lithium cell packing material 10 described above, thus completing production of the lithium cell packing material 20.

Third Embodiment

FIG. 3 is a cross-sectional view illustrating a third embodiment of a lithium cell packing material 30 according to the present invention. This embodiment is described below in detail. In FIG. 3, those structural components that are the same as those in FIG. 1 are labeled using the same symbols, and description of these identical components may be omitted.

<Coating Layer>

As shown in FIG. 3, the packing material for a lithium cell according to the present invention may include, in addition to the layer (A) 14a and the layer (B) 14b, a layer (C) 14c containing an anionic polymer and a cross-linking agent that causes cross-linking of the anionic polymers (hereafter, this layer is referred to as "layer (C)").

The example illustrated in FIG. 3 represents a multilayer structure in which the layer (A) 14a, the layer (B) 14b and the layer (C) 14c are laminated sequentially on top of the aluminum foil layer 13, but the order of lamination of the layer (B) 14b and layer (C) 14c may be reversed.

The rare earth element-based oxide and the phosphoric acid or phosphate are the same as the rare earth element-based oxide and the phosphoric acid or phosphate described in the first embodiment. Further, the cationic polymer and the cross-linking agent that causes cross-linking of the cationic polymers are the same as the cationic polymer and cross-linking agent described in the second embodiment.

(Anionic Polymer)

As a result of intensive investigation, the inventors of the present invention discovered that anionic polymers improved the stability of the layer (A). Examples of the effects achievable include protecting the hard and brittle layer (A) with an acrylic resin component, and trapping ion contaminants derived from the phosphate contained within the rare earth element-based oxide sol (and particularly contaminants derived from Na ions) (namely, a cation catcher).

As a general principle not restricted to lithium cell packing material applications, if a protective layer provided for the purpose of preventing corrosion of an aluminum foil by corrosive compounds contains ion contaminants, and particularly alkali metal ions or alkaline earth metal ions such as Na ions, then these ion contaminants tend to act as the start points for damage of the protective layer. Accordingly, using an anionic polymer to solidify ion contaminants such as Na ions contained within the rare earth element-based oxide sol is effective in improving the durability of the lithium cell packing material.

The anionic polymer is a material that has exactly the opposite properties to the cationic polymer described above. Specific examples include polymers containing carboxyl groups, such as poly(meth)acrylic acids and salts thereof, or copolymers that include (meth)acrylic acid or a salt thereof as a main component. Examples of the components that may be copolymerized in such copolymers include alkyl(meth)acrylate monomers having an alkyl group such as a methyl group, ethyl group, n-propyl group, i-propyl group, n-butyl group, i-butyl group, t-butyl group, 2-ethylhexyl group or cyclohexyl group; amide group-containing monomers such as (meth)acrylamide, N-alkyl (meth)acrylamides and N,N-dialkyl(meth)acrylamides (wherein examples of the alkyl group include a methyl group, ethyl group, n-propyl group, i-propyl group, n-butyl group, i-butyl group, t-butyl group, 2-ethylhexyl group or cyclohexyl group), N-alkoxy (meth) acrylamides and N,N-dialkoxy(meth)acrylamides (wherein examples of the alkoxy group include a methoxy group, ethoxy group, butoxy group or isobutoxy group), N-methylol (meth)acrylamide, and N-phenyl(meth)acrylamide; hydroxyl group-containing monomers such as 2-hydroxyethyl(meth)acrylate and 2-hydroxypropyl (meth)acrylate; glycidyl group-containing monomers such as glycidyl(meth) acrylate and allyl glycidyl ether; silane-containing monomers such as (meth)acryloxypropyltrimethoxysilane and (meth) acryloxypropyltriethoxysilane; and isocyanate group-containing monomers such as (meth)acryloxypropyl isocyanate.

The anionic polymer is extremely effective at capturing ion contaminants, and by using a layer (C) 14c in combination with the aforementioned layer (A) 14a and layer (B) 14b, an even greater improvement in functionality can be expected. However, in the same manner as that described for the cationic polymer, because the anionic polymer is water-based, the use of an anionic polymer by itself tends to result in inferior water resistance. Accordingly, the layer (C) 14c preferably also includes a cross-linking agent that causes cross-linking of the anionic polymers.

As the cross-linking agent, one or more cross-linking agents may be selected from amongst the cross-linking agents described above in relation to the first embodiment.

The cross-linking agent is typically added in an amount within a range from 1 to 50 parts by mass per 100 parts by mass of the anionic polymer. If the blend amount of the cross-linking agent is less than the lower limit of the above-mentioned range, then the amount of cross-linking structures may be insufficient. In contrast, if the blend amount is greater than the upper limit of the above range, then the pot life of the coating liquid may deteriorate.

A single cross-linking agent may be used, or two or more different cross-linking agents may be used in combination.

Further, combinations of a cross-linking agent and a silane coupling agent may also be used.

As described above, the cationic polymer is a material that is extremely effective in trapping hydrofluoric acid, whereas the anionic polymer is a material that is extremely effective in capturing ion contaminants. Furthermore, by adding a cross-linking agent to each polymer, the water resistance can also be improved. Accordingly, by providing a layer (B) 14b containing a cationic polymer and a layer (C) 14c containing an anionic polymer as illustrated in FIG. 3, the electrolyte solution resistance, the hydrofluoric acid resistance and the water resistance of the coating layer 14 can be further improved.

However, the type of cationic polymer-containing layer (B) 14b and anionic polymer-containing layer (C) 14c described above have no function for protecting the aluminum foil from corrosion. Hence, as shown in FIG. 3, by forming the coating layer 14 as a multilayer structure containing the layer (A) 14a in addition to the layer (B) 14b and the layer (C) 14c, a corrosion prevention effect can be obtained for metal films such as an aluminum foil.

Rather than existing in isolation, the cationic polymer within the layer (B) 14b and the anionic polymer within the layer (C) 14c tend to exhibit more effective functionality such as electrolyte solution resistance and hydrofluoric acid resistance when complexed with the rare earth element-based oxide and the phosphoric acid or phosphate contained within the layer (A) 14a. Accordingly, if the proportion of the layer (B) 14b and layer (C) 14c laminated on top of the layer (A) 14a as shown in FIG. 3 is larger than is necessary, then the proportions of the cationic polymer and the anionic polymer that do not form a complex with the rare earth element-based oxide and the phosphoric acid or phosphate contained within the layer (A) 14a, but rather exist in isolation, tends to increase. As a result, the desired functions of electrolyte solution resistance and hydrofluoric acid resistance may not manifest satisfactorily, resulting in a deterioration in the electrolyte solution resistance and the hydrofluoric acid resistance.

Accordingly, in order to enable a more effective manifestation of the electrolyte solution resistance and hydrofluoric acid resistance properties, the relationship between the mass (a) per unit surface area ($g/m^2$) of the layer (A), the mass (b) per unit surface area ($g/m^2$) of the layer (B), and the mass (c) per unit surface area ($g/m^2$) of the layer (C) preferably satisfies the expression $2 \geq (b+c)/a$. If this relationship $\{(b+c)/a\}$ between the mass values for each layer exceeds the above-mentioned range, then although the effects of the present invention can still be obtained, the coating amounts of the coating composition (B) and a coating composition (C) that forms the layer (C) tend to increase, meaning the composition may become more difficult to cure. The drying temperature could simply be set higher or the curing time extended in order to ensure satisfactory curing of the coating composition (B) and the coating composition (C), but this tends to result in a fall in productivity.

Accordingly, in terms of maintaining productivity levels, while also ensuring a favorable improvement in the electrolyte solution resistance and the hydrofluoric acid resistance, the relationship $\{(b+c)/a\}$ between the mass values for each layer preferably satisfies $2 \geq (b+c)/a$, more preferably satisfies $1.5 \geq (b+c)/a \geq 0.01$, and most preferably satisfies $1.0 \geq (b+c)/a \geq 0.1$.

<Production Method for Packing Material for Lithium Cell>

Next is a description of a production method for the lithium cell packing material 30 of the present invention illustrated in FIG. 3, although the present invention is not restricted to the production method described below.

In the step of laminating the coating layer onto the aluminum foil layer, the layer (A) 14a and the layer (B) 14b are first formed on top of the aluminum foil layer 13 in the same manner as the method described for the second embodiment. Subsequently, the coating composition (C) containing the anionic polymer and the cross-linking agent that causes cross-linking of the anionic polymers is coated onto the layer (B) 14b, and is then subjected to drying, curing and baking to form the layer (C) 14c. In this manner, a coating layer 14 composed of the layer (A) 14a, the layer (B) 14b and the layer (C) 14c is laminated on top of the aluminum foil layer 13.

The steps of bonding the base material layer to the aluminum foil layer, and laminating the sealant layer are then conducted in the same manner as the production method for the lithium cell packing material 10 described above, thus completing production of the lithium cell packing material 30.

In the coating layer 14, the layer (A) 14a is preferably laminated directly on top of the aluminum foil layer 13. Furthermore, there are no particular restrictions on the order of lamination of the layer (B) 14b and the layer (C) 14c, and a multilayer structure such as that shown in FIG. 3, in which the layer (A) 14a, the layer (B) 14b and the layer (C) 14c are laminated in sequence may be used, or the order of lamination of the layer (B) 14b and the layer (C) 14c may be reversed.

Moreover, if required, lamination of the layer (A) 14a, the layer (B) 14b and the layer (C) 14c may be repeated.

In this manner, because the lithium cell packing material of the present invention either employs a structure that includes the layer (A) in which the coating layer contains a rare earth element-based oxide and the like, or employs a multilayer structure that includes the layer (A) and the layer (B) containing a cationic polymer and the like, the electrolyte solution resistance, the hydrofluoric acid resistance and the water resistance are excellent. Further, if the packing material also includes the layer (C) containing an anionic polymer, then the electrolyte solution resistance, hydrofluoric acid resistance and water resistance can be further enhanced.

The examples illustrated in FIG. 1 to FIG. 3 were presented as examples of the construction of the coating layer provided in the lithium cell packing material of the present invention, but from the viewpoint of inhibiting corrosion of the aluminum foil, the proportion over which the rare earth element-based oxide and the phosphoric acid or phosphate makes direct contact with the aluminum foil is preferably as large as possible. On the other hand, from the viewpoint of ensuring effective manifestation of the electrolyte solution resistance function, the cationic polymer and the cross-linking agent that causes cross-linking of the cationic polymers are preferably complexed with the rare earth element-based oxide and the phosphoric acid or phosphate. In light of these facts, the coating layer is preferably a multilayer structure such as those illustrated in FIG. 2 and FIG. 3, although even with the single layer structure composed only of the layer (A) shown in FIG. 1, the effects of the present invention can still be satisfactorily achieved.

Furthermore, according to the present invention, a corrosion inhibiting effect for metal foils such as aluminum foil can be obtained even with a conventional coating method, meaning the production process for the lithium cell packing material can be simplified without any adverse impact on the environment.

In other words, the functionality required of a lithium cell packing material can be obtained by simply providing the coating layer 14 on the aluminum foil layer 13. As a result, production is possible not only of the types of structures illustrated in FIG. 1 to FIG. 3, which are produced via a dry/wet process that uses an adhesive resin layer and either extrusion lamination or thermal lamination, but also of the types of structures illustrated in FIG. 4 to FIG. 6, which are produced via a simpler dry lamination process using a second adhesive layer 15a. In one example of the production method employed for the structures illustrated in FIG. 4 to FIG. 6, a coating layer 14 described above in the first to third embodiments is provided on one surface of an aluminum foil layer 13, a base material layer 11 is laminated via a first adhesive layer 12 to the other side of the aluminum foil layer 13, and a sealant layer 16 is then laminated to the coating layer 14 via a second adhesive layer 15a.

EXAMPLES

Test examples of the present invention are presented below, although the present invention is in no way limited by these examples.

[Used Materials]

The common materials used in the following test examples are listed below.

<Coating Layer 1: Layer (A) Containing Rare Earth Element-Based Oxide and the Like>

A-1: A "sodium polyphosphate-stabilized cerium oxide sol" prepared using distilled water as the solvent and having a solid fraction concentration of 10 wt %. The cerium oxide sol was obtained by adding 10 parts by mass of the sodium salt of the phosphoric acid to 100 parts by mass of cerium oxide.

A-2: A "sodium polyphosphate-stabilized cerium oxide sol" prepared using distilled water as the solvent and having a solid fraction concentration of 10 wt %. The cerium oxide sol was obtained by adding 0.5 parts by mass of the sodium salt of the phosphoric acid to 100 parts by mass of cerium oxide.

A-3: An "acetic acid-stabilized cerium oxide sol" prepared using distilled water as the solvent and having a solid fraction concentration of 10 wt %. The cerium oxide sol was obtained by adding 10 parts by mass of the sodium salt of the phosphoric acid to 100 parts by mass of cerium oxide.

<Coating Layer 2: Layer (B) Containing Cationic Polymer and the Like>

B-1: A "polyallylamine" prepared using distilled water as the solvent and having a solid fraction concentration of 5 wt %.

B-2: A composition composed of 90 wt % of a "polyallylamine" and 10 wt % of a "1,6-hexanediol epichlorohydrin adduct", prepared using distilled water as the solvent and having a solid fraction concentration of 5 wt %.

B-3: A "polyethyleneimine" prepared using distilled water as the solvent and having a solid fraction concentration of 5 wt %.

B-4: A composition composed of 90 wt % of a "polyethyleneimine" and 10 wt % of an "acrylic-isopropenyloxazoline copolymer", prepared using distilled water as the solvent and having a solid fraction concentration of 5 wt %.

B-5: A composition prepared by adding 5 parts by mass of aminopropyltrimethoxysilane to 100 parts by mass of B-2.

<Coating Layer 3: Layer (C) Containing Anionic Polymer and the Like>

C-1: An "ammonium polyacrylate" prepared using distilled water as the solvent and having a solid fraction concentration of 5 wt %.

C-2: A composition composed of 90 wt % of an "ammonium polyacrylate" and 10 wt % of an "acrylic-isopropenyloxazoline copolymer", prepared using distilled water as the solvent and having a solid fraction concentration of 5 wt %.

<Heat-Resistant Base Material Layer>

D-1: a biaxially oriented polyamide film (25 μm).

<Aluminum Foil Layer>

E-1: An annealed lightweight aluminum foil No. 8079 (40 μm).

The number "8079" is an alloy number listed in JIS H 4160 (standard name: "Aluminum and aluminum alloy foils") of the JIS standards (Japanese Industrial Standards).

<Adhesive Resin Layer and Sealant Layer>

F-1: a multilayer polypropylene film (a cast film: 30 μm).

F-2: a maleic anhydride-modified polypropylene resin (MFR=12 extrusion lamination grade)

F-3: a composition prepared by blending a toluene-dispersed maleic anhydride-modified polypropylene resin (a baked resin, solid fraction: 17 wt %) with a tolylene diisocyanate adduct (solid fraction: 75 wt %) and β-(3,4-epoxycyclohexyl)ethyltrimethoxysilane (solid fraction: 100 wt %), using a blend ratio of 72/6/22.

[Preparation and Method of Evaluating Lithium Cell Packing Materials]

<Packing Material Preparation 1>

First, the composition used for forming each coating layer (namely, the compositions A-1 to A-3, B-1 to B-5, and C-1 to C-2) was coated onto an aluminum foil coil (E-1) using an appropriate microgravure coating method, and a baking treatment was then performed in a drying unit at a temperature within a range from 150 to 250° C. in accordance with the components of that particular coating layer, thereby laminating the coating layer onto the aluminum foil.

Subsequently, using a dry lamination method, a heat-resistant base material layer (D-1) was provided on the opposite surface of the aluminum foil layer from the coating layer with a polyurethane-based adhesive (A525/A52, manufactured by Mitsui Chemicals Polyurethane, Inc.) disposed therebetween. With the resulting laminate set on the winder portion of an extrusion lamination machine, and the sealant layer (F-1) set as the sandwich base material, a 20 μm thick layer of the adhesive resin (F-2) was subjected to sandwich lamination under process conditions including 290° C. and 80 m/minute. Subsequently, a sealant layer was laminated on top of the coating layer via an adhesive resin layer. Thermocompression bonding (heat treatment) was then conducted to complete preparation of the packing material for a lithium cell.

<Packing Material Preparation 2>

The steps up to and including the provision of the heat-resistant base material layer (D-1) by dry lamination were performed in the same manner as the packing material preparation 1. Subsequently, the adhesive resin (F-3) was coated onto the coating layer using a gravure coating technique in an amount sufficient to yield a dry thickness of 5 μm, and a baking treatment was performed. Subsequently, the sealant layer (F-1) as subjected to thermal lamination in an in-line process, thus completing preparation of the packing material for a lithium cell.

<Evaluations>

Each of the prepared lithium cell packing materials was cut into strip-shapes samples having a size of 100×15 mm for the purposes of evaluation, and the evaluations described below were then performed.

(Electrolyte Solution Resistance Evaluation 1: Evaluation of Organic Solvent Resistance)

An electrolyte solution was prepared by adding 1.5 M of $LiPF_6$ to a solution of ethylene carbonate/diethyl carbonate/dimethyl carbonate=1/1/1, and this electrolyte solution was then placed inside a Teflon (a registered trademark) container having an internal capacity of 250 ml. A sample was then inserted into the container, and the container was sealed, and then stored for 3 hours at 85° C. The state of peeling of the sample following storage was evaluated against the criteria listed below.

O: no delamination occurred, the laminate strength is at a level that makes peeling difficult, or at a level that results in rupture of the sealant layer (good).

Δ: no delamination occurred, but the laminate strength is at a level that means peeling is possible (at least 100 gf/15 mm, crosshead speed: 300 mm/minute) (fair).

x: layer lifting due to peeling was observed (unsatisfactory).

(Electrolyte Solution Resistance Evaluation 2: Evaluation of Hydrofluoric Acid Resistance)

A sample that had been subjected to the electrolyte solution resistance evaluation 1 was immersed in water overnight, and the state of peeling of the sample was evaluated. The evaluation criteria were the same as those listed above for the electrolyte solution resistance evaluation 1.

(Electrolyte Solution Resistance Evaluation 3: Evaluation of Hydrofluoric Acid Resistance)

With the exception of using the electrolyte solution of the electrolyte solution resistance evaluation 1 to which 1,500 ppm of water had been added as the test electrolyte solution, an evaluation was conducted in the same manner as the electrolyte solution resistance evaluation 1. Subsequently, the sample was immersed in water overnight, and the state of peeling of the sample was then evaluated. The evaluation criteria were the same as those listed above for the electrolyte solution resistance evaluation 1.

(Water Resistance Evaluation)

Notches were inserted in advance in the sample to facilitate peeling, and the notched sample was then immersed in water overnight, and the state of peeling of the sample was then evaluated. The evaluation criteria were the same as those listed above for the electrolyte solution resistance evaluation 1.

(Strength Evaluation)

Each of the samples obtained via the methods described above was folded so that the sealant layer surfaces faced each other, and heat sealing was then conducted for 3 seconds under conditions including 190° C. and 0.3 MPa. The sample was then cut into strips of width 15 mm, and a universal tester (Tensilon, manufactured by Orientec Co., Ltd.) was used to evaluate the heat seal strength and the state of rupture when a T-type peeling measurement was conducted at a crosshead speed of 300 mm/minute. The evaluation criteria are listed below. An evaluation result of O was taken as a passing grade.

O: the strength was not less than 40 N/15 mm, and the rupture mode involved peeling at a location other than the aluminum foil layer/coating layer interface or the vicinity thereof (good).

x: either the strength was less than 40 N/15 mm, or the strength was at least 40 N/15 mm but the rupture mode involved peeling in the vicinity of the aluminum foil layer/coating layer interface (unsatisfactory).

(Overall Evaluation)

The evaluation results above were combined, and an overall evaluation was made based on the following criteria.

OO: all the evaluation results were O (excellent).

O: of all the evaluation results, four were O, and the remainder was Δ (good).

Δ: of all the evaluation results, three were O, and the remainder were Δ (fair).

x: of all the evaluation results, two or fewer were O, or at least one of the electrolyte solution resistance evaluations was x (unsatisfactory).

Examples 1 to 10

Using the materials shown in Table 1, lithium cell packing materials were prepared using the packing material preparation 1 in the case of Examples 1 to 7, or using the packing material preparation 2 in the case of Examples 8 to 10. Each of the lithium cell packing materials was then subjected to the various evaluations described above. The results are shown in Table 1.

Comparative Examples 1 to 10

Using the materials shown in Table 2, lithium cell packing materials were prepared using the packing material preparation 1, and then subjected to the various evaluations described above. The results are shown in Table 2.

TABLE 1

|  | Heat-resistant base material layer | Aluminum foil layer | Coating layer | | Adhesive resin layer | Sealant layer |
|---|---|---|---|---|---|---|
|  |  |  | First layer (mass *1) | Second layer (mass *1) |  |  |
| Example 1 | D-1 | E-1 | A-1 (80 mg/m$^2$) | — | F-2 | F-1 |
| Example 2 | D-1 | E-1 | A-1 (80 mg/m$^2$) | B-2 (25 mg/m$^2$) | F-2 | F-1 |
| Example 3 | D-1 | E-1 | A-1 (80 mg/m$^2$) | B-4 (25 mg/m$^2$) | F-2 | F-1 |
| Example 4 | D-1 | E-1 | A-1 (80 mg/m$^2$) | B-5 (25 mg/m$^2$) | F-2 | F-1 |
| Example 5 | D-1 | E-1 | A-1 (250 mg/m$^2$) | B-5 (25 mg/m$^2$) | F-2 | F-1 |
| Example 6 | D-1 | E-1 | A-1 (80 mg/m$^2$) | B-5 (100 mg/m$^2$) | F-2 | F-1 |
| Example 7 | D-1 | E-1 | A-1 (80 mg/m$^2$) | C-2/B-5 *2 (25 mg/m$^2$ each) | F-2 | F-1 |
| Example 8 | D-1 | E-1 | A-1 (80 mg/m$^2$) | B-2 (25 mg/m$^2$) | F-3 | F-1 |
| Example 9 | D-1 | E-1 | A-1 (80 mg/m$^2$) | B-4 (25 mg/m$^2$) | F-3 | F-1 |
| Example 10 | D-1 | E-1 | A-1 (80 mg/m$^2$) | B-5 (25 mg/m$^2$) | F-3 | F-1 |

TABLE 1-continued

|  | Electrolyte solution resistance evaluation | | | Water resistance evaluation | Strength evaluation | Overall evaluation |
| --- | --- | --- | --- | --- | --- | --- |
|  | Evaluation 1 | Evaluation 2 | Evaluation 3 | | | |
| Example 1 | ○ | Δ | Δ | ○ | ○ | Δ |
| Example 2 | ○ | ○ | ○ | ○ | ○ | ○○ |
| Example 3 | ○ | ○ | ○ | ○ | ○ | ○○ |
| Example 4 | ○ | ○ | ○ | ○ | ○ | ○○ |
| Example 5 | ○ | ○ | ○ | ○ | Δ | ○ |
| Example 6 | ○ | ○ | Δ | ○ | ○ | ○ |
| Example 7 | ○ | ○ | ○ | ○ | ○ | ○○ |
| Example 8 | ○ | ○ | ○ | ○ | ○ | ○○ |
| Example 9 | ○ | ○ | ○ | ○ | ○ | ○○ |
| Example 10 | ○ | ○ | ○ | ○ | ○ | ○○ |

*1: mass per unit surface area of layer,
*2: second layer/third layer

TABLE 2

|  | Heat-resistant base material layer | Aluminum foil layer | Coating layer | | Adhesive resin layer | Sealant layer |
| --- | --- | --- | --- | --- | --- | --- |
|  | | | First layer (mass *1) | Second layer (mass *1) | | |
| Comparative Example 1 | D-1 | E-1 | B-1 (25 mg/m$^2$) | — | F-2 | F-1 |
| Comparative Example 2 | D-1 | E-1 | B-2 (25 mg/m$^2$) | — | F-2 | F-1 |
| Comparative Example 3 | D-1 | E-1 | B-3 (25 mg/m$^2$) | — | F-2 | F-1 |
| Comparative Example 4 | D-1 | E-1 | B-4 (80 mg/m$^2$) | — | F-2 | F-1 |
| Comparative Example 5 | D-1 | E-1 | B-5 (25 mg/m$^2$) | — | F-2 | F-1 |
| Comparative Example 6 | D-1 | E-1 | A-2 (80 mg/m$^2$) | — | F-2 | F-1 |
| Comparative Example 7 | D-1 | E-1 | A-3 (80 mg/m$^2$) | B-2 (25 mg/m$^2$) | F-2 | F-1 |
| Comparative Example 8 | D-1 | E-1 | A-3 (80 mg/m$^2$) | B-4 (25 mg/m$^2$) | F-2 | F-1 |
| Comparative Example 9 | D-1 | E-1 | A-3 (80 mg/m$^2$) | B-5 (25 mg/m$^2$) | F-2 | F-1 |
| Comparative Example 10 | D-1 | E-1 | A-3 (80 mg/m$^2$) | C-2 (25 mg/m$^2$) | F-2 | F-1 |

|  | Electrolyte solution resistance evaluation | | | Water resistance evaluation | Strength evaluation | Overall evaluation |
| --- | --- | --- | --- | --- | --- | --- |
|  | Evaluation 1 | Evaluation 2 | Evaluation 3 | | | |
| Comparative Example 1 | ○ | X | X | X | ○ | X |
| Comparative Example 2 | ○ | X | X | ○ | ○ | X |
| Comparative Example 3 | ○ | X | X | X | ○ | X |
| Comparative Example 4 | ○ | X | X | ○ | ○ | X |
| Comparative Example 5 | ○ | Δ | X | ○ | ○ | X |
| Comparative Example 6 | — | — | — | — | — | — |
| Comparative Example 7 | X | X | X | ○ | X | X |
| Comparative Example 8 | X | X | X | ○ | X | X |
| Comparative Example 9 | X | X | X | ○ | X | X |
| Comparative Example 10 | X | X | X | ○ | X | X |

*1: mass per unit surface area of layer

Example 11

Comparative Example 11

Examples 1 to 10 and Comparative Examples 1 to 10 represent structures in which a lithium cell level of performance is achieved by using a technique such as thermocompression bonding (heat treatment) or thermal lamination, and a feature of these techniques is the use of an adhesive resin (the acid-modified polyurethane resin). Example 11 and Comparative Example 11 describe cases in which this type of adhesive resin is replaced with a polyurethane-based adhesive used in dry lamination.

The production method used for the packing material of Example 11 and Comparative Example 11 is described below. First, the composition used for forming each coating layer was coated onto an aluminum foil coil (E-1) using an appropriate microgravure coating method. A baking treatment was then performed in a drying unit at a temperature within a range from 150 to 250° C. in accordance with the components of the coating layer, thereby laminating the coating layer onto the aluminum foil.

Subsequently, using a dry lamination method, a heat-resistant base material layer (D-1) was provided on the opposite surface of the aluminum foil layer from the coating layer with a polyurethane-based adhesive (A525/A52, manufactured by Mitsui Chemicals Polyurethane, Inc.) disposed therebetween. A dry lamination method was then used to provide a polyurethane-based adhesive, containing a polyester polyol as the main component and an isophorone diisocyanate isocyanurate as a curing agent, on the side of the coating layer, using a dry coating amount of 5 g/m². Subsequently, a sealant layer (F-1) was laminated to the polyurethane-based adhesive. The laminate was then aged for 5 days at 60° C., completing preparation of a lithium cell packing material.

Using the materials shown in Table 3, tests were performed using the dry laminate structures described above. The evaluation methods used and the evaluation criteria are as described above.

anionic polymer in addition to the layer (A) and layer (B) (Example 7), not only was excellent organic solvent resistance achieved, but the hydrofluoric acid resistance and water resistance were also excellent. In those cases where the relationship (b/a) between the mass (a) of the layer (A) and the mass (b) of the layer (B) satisfied the expression $1.0 \geq b/a \geq 0.1$, the hydrofluoric acid resistance was particularly favorable, even under more severe conditions. Furthermore, in those cases where the mass of the layer (A) was 80 mg/m², the strength of the packing material was also favorable.

Further, even if the production method for the lithium cell packing material was altered (Examples 8 and 9), excellent organic solvent resistance, hydrofluoric acid resistance and water resistance similar to that obtained in Examples 2 to 4 was achieved, and the strength was also favorable.

Furthermore, as is evident from the overall evaluation results, the lithium cell packing materials obtained in Examples were superior to the lithium cell packing materials obtained in Comparative Examples in terms of functional performance such as resistance and strength.

In contrast, in those cases where the coating layer was a single layer structure that had no layer (A) and was composed solely of the layer (B) (Comparative Examples 1 to 5), the evaluation results represent an evaluation of the resistance provided by the layer (B), and although the organic solvent resistance and strength were similar to those observed for Examples, the hydrofluoric acid resistance was markedly inferior to that of Examples. In those cases where the coating layer contained no cross-linking agent (Comparative Examples 1 and 3), the water resistance was also unsatisfactory because no cross-linked structures were formed in the coating layer.

In Comparative Example 6, because the blend amount of the Na salt of the phosphoric acid within the layer (A) was insufficient, the dispersion stabilization of the rare earth element-based oxide was inadequate, which made application of the coating layer impossible, meaning a lithium cell packing material could not be obtained.

TABLE 3

| | Heat-resistant base material layer | Aluminum foil layer | Coating layer | | Adhesive resin layer | Sealant layer |
|---|---|---|---|---|---|---|
| | | | First layer (mass *1) | Second layer (mass *1) | | |
| Example 11 | D-1 | E-1 | A-1 (80 mg/m²) | B-2 (25 mg/m²) | *3 | F-1 |
| Comparative Example 11 | D-1 | E-1 | B-2 (25 mg/m²) | — | *3 | F-1 |

| | Electrolyte solution resistance evaluation | | | Water resistance evaluation | Strength evaluation | Overall evaluation |
|---|---|---|---|---|---|---|
| | Evaluation 1 | Evaluation 2 | Evaluation 3 | | | |
| Example 11 | ○ | Δ | Δ | ○ | ○ | Δ |
| Comparative Example 11 | ○ | X | X | ○ | ○ | X |

*1: mass per unit surface area of layer
*3: a polyurethane-based adhesive containing a polyester polyol as the main component, and using an isophorone diisocyanate isocyanurate as a curing agent In the case where the coating layer was composed of a layer (A) formed by blending a Na salt of a phosphoric acid with a rare earth element-based oxide (Example 1), those cases where the coating layer was a 2-layer structure composed of the layer (A) and a layer (B) containing a cationic polymer (Examples 2 to 6), and the case where the coating layer was a 3-layer structure that included a layer (C) containing an In Comparative Examples 7 to 10, acetic acid was used as the dispersion stabilizer, and therefore the organic solvent resistance and hydrofluoric acid resistance were unsatisfactory. Furthermore, the strength was also weaker than that observed for Examples.

Furthermore, these structures confirmed that excellent performance could be achieved by using thermocompression bonding (heat treatment) and thermal lamination, but satisfactory performance as a lithium cell packing material was also able to be maintained using a dry laminate structure. Accordingly, in the present invention, it was confirmed that by interposing the coating layer described above, favorable performance as a lithium cell packing material could be achieved, regardless of the production method.

INDUSTRIAL APPLICABILITY

According to the present invention, a packing material for a lithium cell that exhibits excellent electrolyte solution resistance, hydrofluoric acid resistance and water resistance, as well as favorable strength properties can be obtained without performing conventional chemical conversion treatments such as chromate treatments. Accordingly, the present invention is very useful industrially.

The invention claimed is:

1. A packing material for a lithium cell, comprising:
a first adhesive layer, an aluminum foil layer, a coating layer, an adhesive resin layer or a second adhesive layer, and a sealant layer laminated sequentially on one surface of a base material layer, wherein
the coating layer is a multilayer structure comprising a layer (A) and a layer (B),
the layer (A) comprises 1 to 100 parts by mass of a phosphoric acid or a phosphate having been blended into 100 parts by mass of a rare earth element-based oxide,
the layer (A) is formed using a rare earth element-based oxide sol in which the rare earth element-based oxide has been stably dispersed using the phosphoric acid or the phosphate, and
the layer (B) contains a cationic polymer and a cross-linking agent that causes cross-linking of the cationic polymers.

2. A packing material for a lithium cell according to claim 1, wherein a relationship between a mass (a) per unit surface area (g/m$^2$) of the layer (A), and a mass (b) per unit surface area (g/m$^2$) of the layer (B) satisfies an expression $2 \geq b/a$.

3. A packing material for a lithium cell according to claim 1, wherein the cationic polymer is at least one polymer selected from the group consisting of polyethyleneimines, ionic polymer complexes made of a polyethyleneimine and a polymer having carboxylic acid groups, primary amine-grafted acrylic resins having a primary amine grafted to a main acrylic backbone, polyallylamines and derivatives thereof, and aminophenols.

4. A packing material for a lithium cell according to claim 1, wherein the cross-linking agent is at least one material selected from the group consisting of compounds having an isocyanate group, a glycidyl group, a carboxyl group or an oxazoline group as a functional group, and silane coupling agents.

5. A packing material for a lithium cell according to claim 1, wherein the layer (A) is laminated directly onto the aluminum foil layer.

6. A packing material for a lithium cell according to claim 1, wherein a mass (a) per unit surface area (g/m$^2$) of the layer (A) is within a range from 0.010 to 0.200 g/m$^2$.

7. A packing material for a lithium cell according to claim 1, wherein the rare earth element-based oxide is cerium oxide.

8. A packing material for a lithium cell according to claim 1, wherein the phosphoric acid or phosphate is a condensed phosphoric acid or a condensed phosphate.

9. A packing material for a lithium cell according to claim 1, wherein the adhesive resin layer is composed of (i) or (ii) below, and the second adhesive layer is composed of (iii) below:
(i) an acid-modified polyolefin-based resin ($\alpha$),
(ii) a resin composition in which an acid-modified polyolefin-based resin ($\alpha$) (30 to 99% by mass) is combined with an isocyanate compound or derivative thereof ($\beta$) and a silane coupling agent ($\gamma$) (($\beta$+$\gamma$): 1 to 70% by mass), provided that if ($\beta$)+($\gamma$) is deemed to be 100, then ($\beta$):($\gamma$)=10 to 90:90 to 10, and
(iii) a polyurethane-based adhesive comprising a polyol component as a main component, and an isocyanate compound or derivative thereof as a curing agent.

10. A production method for a packing material for a lithium cell, comprising:
sequentially laminating a first adhesive layer, an aluminum foil layer, a coating layer, an adhesive resin layer or a second adhesive layer, and a sealant layer on one surface of a base material layer, wherein
the coating layer is laminated on top of the aluminum foil layer by applying a coating composition (A), which comprises a rare earth element-based oxide and 1 to 100 parts by mass of a phosphoric acid or a phosphate per 100 parts by mass of the rare earth element-based oxide, onto the aluminum foil layer and subsequently drying the coating composition (A) to form a layer (A), and
the coating composition (A) is a rare earth element-based oxide sol in which the rare earth element-based oxide has been stably dispersed using the phosphoric acid or the phosphate.

11. A production method for a packing material for a lithium cell according to claim 10, wherein the coating layer is laminated on top of the aluminum foil layer by further applying a coating composition (B), which comprises a cationic polymer and a cross-linking agent that causes cross-linking of the cationic polymers, onto the layer (A), and subsequently drying the coating composition (B) to form a layer (B).

12. A production method for a packing material for a lithium cell, comprising:
sequentially laminating a first adhesive layer, an aluminum foil layer, a coating layer, an adhesive resin layer or a second adhesive layer, and a sealant layer on one surface of a base material layer, the coating layer being a multilayer structure comprising a layer (A) and a layer (B), wherein
the layer (A) is laminated on top of the aluminum foil layer by applying a coating composition (A), which comprises a rare earth element-based oxide and 1 to 100 parts by mass of a phosphoric acid or a phosphate per 100 parts by mass of the rare earth element-based oxide, onto the aluminum foil layer and subsequently drying the coating composition (A) to form the layer (A), and the coating composition (A) is a rare earth element-based oxide sol in which the rare earth element-based oxide has been stably dispersed using the phosphoric acid or the phosphate, and
the layer (B) is laminated on top of the layer (A) by applying a coating composition (B), which comprises a cationic polymer and a cross-linking agent that causes cross-linking of the cationic polymers, onto the layer (A), and subsequently drying the coating composition (B) to form the layer (B).

* * * * *